United States Patent
Glueck

(10) Patent No.: US 7,637,669 B2
(45) Date of Patent: Dec. 29, 2009

(54) ROLLER BEARING WITH ROLLING BODIES OF A SHAPE MEMORY ALLOY

(75) Inventor: Stefan Glueck, Niederwerrn (DE)

(73) Assignee: Schaeffler KG, Herzogenaurach (DE)

( * ) Notice: Subject to any disclaimer, the term of this patent is extended or adjusted under 35 U.S.C. 154(b) by 426 days.

(21) Appl. No.: 11/718,924

(22) PCT Filed: Nov. 4, 2005

(86) PCT No.: PCT/DE2005/001977

§ 371 (c)(1),
(2), (4) Date: May 9, 2007

(87) PCT Pub. No.: WO2006/050698

PCT Pub. Date: May 18, 2006

(65) Prior Publication Data

US 2008/0089630 A1 Apr. 17, 2008

(30) Foreign Application Priority Data

Nov. 9, 2004 (DE) .................. 10 2004 053 937

(51) Int. Cl.
*F16C 43/06* (2006.01)
*F16C 33/30* (2006.01)

(52) U.S. Cl. .................. 384/559; 384/492; 384/493; 384/548

(58) Field of Classification Search .................. 384/461, 384/492–493, 513, 521, 522, 553, 557, 559, 384/565–569, 572, 903, 548
See application file for complete search history.

(56) References Cited

U.S. PATENT DOCUMENTS

| 3,123,413 | A |   | 3/1964 | Heim |
| 3,399,008 | A |   | 8/1968 | Farrell |
| 4,324,441 | A | * | 4/1982 | Rouverol et al. ............ 384/492 |
| 4,744,678 | A | * | 5/1988 | Fickelscher ................. 384/461 |
| 4,858,293 | A |   | 8/1989 | Rosenzweig et al. |
| 5,092,898 | A | * | 3/1992 | Bekki et al. .............. 623/22.16 |
| 5,116,156 | A | * | 5/1992 | Landi ......................... 401/208 |
| 5,630,671 | A |   | 5/1997 | Larson et al. |
| 6,019,518 | A |   | 2/2000 | Yoon et al. |

FOREIGN PATENT DOCUMENTS

| DE | 24 07 477 Y | 8/1975 |
| DE | 101 20 489 A | 11/2002 |
| DE | 102 14 468 A | 10/2003 |
| DE | 102 20 419 Y | 11/2003 |

(Continued)

*Primary Examiner*—Marcus Charles
(74) *Attorney, Agent, or Firm*—Lucas & Mercanti, LLP

(57) ABSTRACT

The anti-friction bearing has an outer bearing ring, an inner bearing ring and rolling bodies that are located between the bearing rings. The race of the outer bearing ring and the inner bearing ring are laterally delimited by two continuous rims that are formed as one piece with the races. The bearing is filled with the rolling bodies through the free space between the two rims. A partial quantity of the rolling bodies is made of a shape memory alloy, the cross-section of the bodies being deformed to fit the dimensions of the free space between the rims. After introduction into the bearing and once they have reached a specific temperature, the bodies regain their original shape.

4 Claims, 1 Drawing Sheet

FOREIGN PATENT DOCUMENTS

| | | |
|---|---|---|
| JP | 57 0 69 115 Y | 4/1982 |
| JP | 59 1 33 823 Y | 8/1984 |
| JP | 60 2 49 722 Y | 12/1985 |
| JP | 63 195411 A | 8/1988 |
| JP | 03107659 A * | 5/1991 |
| JP | 06200933 A * | 7/1994 |
| JP | 2001 1 16 041 Y | 4/2001 |

* cited by examiner

ROLLER BEARING WITH ROLLING BODIES OF A SHAPE MEMORY ALLOY

FIELD OF THE INVENTION

The invention relates to an anti-friction bearing and, more particularly to solid-bodied ball bearings, roller bearings or needle bearings.

BACKGROUND OF THE INVENTION

It is generally known to a person skilled in the art of anti-friction bearings that solid-bodied anti-friction bearings consist essentially of an outer bearing ring and of an inner bearing ring and also of a number of rolling bodies which are arranged between the bearing rings and which roll on a raceway of the outer bearing ring and on a raceway of the inner bearing ring without any cage guidance with respect to one another. Since anti-friction bearings of this type are distinguished by a high load-bearing capacity and, in addition to radial forces, are also to absorb axial forces in both directions, they must have, both on the outer and on the inner bearing ring, a lateral delimitation of their raceways by means of rims on which the rolling bodies can be supported for force transmission. If these rims are then designed as peripherally continuous rims connected in one piece to the bearing rings, however, it is not possible, as a consequence of construction, to fill the anti-friction bearing with rolling bodies completely without interspaces.

To eliminate this deficiency, therefore, it became known to arrange on one side of the anti-friction bearing, in the opposite rims of the outer and of the inner bearing ring, a clearance corresponding to the shape of the rolling bodies and acting as a filling orifice through which the rolling bodies are introduced into the anti-friction bearing and distributed. However, as a rule, this filling orifice remains unclosed and therefore has the disadvantage that, when the bearing is in operation, the rolling bodies always have to run past this filling orifice. Particularly where grooved ball bearings are concerned, in which the filling orifice issues into the raceways of the rolling bodies, the result of this, however, is that a "catching" or jamming of the rolling bodies at this filling orifice may occur, above all when axial forces press the rolling bodies against the rims of the anti-friction bearing which are provided with the filling orifice.

It was therefore proposed by DE 24 07 477 A1 to reseal the filling orifice in the rims of the bearing rings after filling the anti-friction bearing with the rolling bodies, in such a way that the closing pieces previously broken out of the rims of the bearing rings via a milled predetermined breaking notch are inserted into the rims again by adhesive bonding or welding. Although such a type of closing of the filling orifice is to have the advantage that the closing pieces do not form, with respect to the rim guide surface, any edges at which a "hooking" of the rolling bodies or a scraping of their end faces may occur, nevertheless, by the closing pieces being bonded in adhesively or welded, adverse burrs or adhesive excesses may form on the rim guide surface and may result, as before, in such a "hooking" of the rolling bodies or in a scraping of their end faces. Furthermore, the junctions of the closing pieces with the remaining rim always constitute a weak point in terms of their resistance, so that anti-friction bearings of this type can, in one direction, be loaded axially to only a limited extent.

A further possibility for providing a solid-bodied anti-friction bearing is disclosed, moreover, in DE 102 20 419 A1. In this anti-friction bearing designed as a cylindrical roller bearing, only the raceway of the outer or of the inner bearing ring has two lateral rims connected in one piece to the latter, whereas the raceway of the other bearing ring is delimited on only one side by such a rim. The second rim of this bearing ring is formed by a separate component, which, after the anti-friction bearing has been filled with the cylindrical rollers, is snapped from the rimless side of the one bearing ring into a peripheral radial slot in the border area of the raceway of this bearing ring.

Such an anti-friction bearing has the disadvantage, however, that the rim designed as a separate component and its fastening to the corresponding bearing ring require an additional outlay in manufacturing and assembly terms which adversely increases the production costs for the anti-friction bearing. Moreover, here too, the separately fastened rim constitutes a weak point in terms of its strength, as compared with the remaining rims of the bearing which are connected in one piece to the bearing rings, and therefore even an anti-friction bearing designed in this way can be loaded to only a limited extent in one axial direction.

OBJECT OF THE INVENTION

Proceeding from the expounded disadvantages of the solutions of the known prior art, therefore, the object on which the invention is based is to design an anti-friction bearing, in particular a solid-bodied ball bearing, roller bearing or needle bearing, which, without the lateral rims on the raceways of the bearing rings being weakened, can be filled completely with rolling bodies without interspaces and can be loaded equally in both axial directions.

DESCRIPTION OF THE INVENTION

According to the invention, in an anti-friction bearing, this object is achieved in that both the raceway of the outer bearing ring and the raceway of the inner bearing ring are delimited laterally by two peripherally continuous rims connected in one piece to these, the filling of the anti-friction bearing with the rolling bodies taking place through the free space between a rim of the outer bearing ring and a rim of the inner bearing ring with at least a subset of rolling bodies consisting of a shape memory alloy which are deformed in cross section to the dimension of the free space between the guide rims of the bearing rings and, after insertion into the anti-friction bearing, automatically assume, when a predetermined temperature is reached, their original shape corresponding to the shape of the remaining rolling bodies.

Shape memory alloys or memory alloys, as they are known, have long been the subject of application-oriented material research and are distinguished in that, after suitable treatment, they change their configuration as a function of temperature or of pressure by virtue of a transformation from austenite to martensite. In their low-temperature shape, workpieces consisting of such alloys can be deformed permanently, that is to say ostensibly plastically, while, under heating to above the transformation temperature, they resume their original shape. When these workpieces are cooled again, they can be deformed plastically again, but, insofar as they are heated appropriately, resume their macroscopic original high-temperature shape by a return of their microstructure to austenite. A basic distinction can be made in the shape memory behavior between the one-way effect and the two-way effect. In the one-way effect, a material which has been deformed at a low temperature resumes its original shape when it has been heated to a higher temperature. The material, as it were, remembers its original shape during heating and maintains this shape even during subsequent cooling. By contrast, what is designated as a two-way effect is the phenomenon in which the material, both in the case of a temperature rise and during cooling, remembers its inculcated shape, that is to say one shape at a high temperature and another shape at a low temperature.

However, since shape memory alloys of this type are relatively cost-intensive because of their high-grade alloying constituents, in a further embodiment of the anti-friction bearing designed according to the invention it is proposed that the number of rolling bodies consisting of a shape memory alloy correspond preferably merely to about half the overall number of rolling bodies of the anti-friction bearing. The rolling bodies consisting of a shape memory alloy are preferably arranged so as to be uniformly distributed circumferentially between the remaining rolling bodies of the anti-friction bearing, in a particularly preferred embodiment one rolling body which consists of a shape memory alloy being arranged between two conventional rolling bodies.

Such a number and arrangement of the rolling bodies consisting of a shape memory alloy has proven particularly advantageous, since the filling of the anti-friction bearing designed according to the invention with the conventional rolling bodies consisting of an anti-friction bearing steel must first take place in a way known per se on account of its continuous rims on the bearing rings. In this case, the bearing rings are first arranged eccentrically with respect to one another, and subsequently the free sickle-shaped space occurring between the bearing rings is filled with the conventional rolling bodies. Thereafter, utilizing the elasticity of the two bearing rings, the inner bearing ring is brought between the first and the last rolling body into the position concentric with respect to the outer ring, and, finally, the rolling bodies are distributed uniformly on the circumference of their raceways. Advantageously, the size and number of the conventional rolling bodies are in this case dimensioned such that, between two of these rolling bodies, an interspace arises, the size of which is sufficient, as the last step of the assembly of the anti-friction bearing, to fill this interspace with a further rolling body consisting of a shape memory alloy. It would also be conceivable, however, to distribute the conventional rolling bodies on the circumference of their raceways such case two or more of these rolling bodies are arranged directly in succession, and the interspace arising is filled with an equal number of successively arranged rolling bodies consisting of a shape memory alloy.

In an expedient development of the anti-friction bearing designed according to the invention, it is further proposed that the rolling bodies consisting of a shape memory alloy be preferably produced from a nickel/titanium alloy with a one-way or two-way characteristic, which is easily deformable in its martensitic low-temperature phase and assumes its original manufacturing shape during the transition to its austenitic high-temperature phase. When a nickel/titanium alloy with a one-way characteristic is used, the rolling bodies remain in their original manufacturing shape after their transition to their austenitic high-temperature phase and the anti-friction bearing can no longer be demounted. By contrast, the use of a nickel/titanium alloy with a two-way characteristic has the advantage that this "remembers" both its shape in the low-temperature phase and its shape in the high-temperature phase, so that, when the anti-friction bearing is cooled to the low temperature of the shape memory alloy for the purpose of demounting the anti-friction bearing, the rolling bodies resume their deformed shape and can thus be removed from the anti-friction bearing without difficulty.

A particularly advantageous embodiment of an anti-friction bearing designed according to the invention is when both the martensitic low-temperature phase and the austenitic high-temperature phase of the shape memory alloy for the rolling bodies are fixed outside the typical operating temperatures of the anti-friction bearing. In a grooved ball bearing designed according to the invention for a machine tool spindle or the like, the low-temperature phase of the shape memory alloy is fixed, for example, approximately at the nitrogen boiling temperature ($-77°$ C.) and the high-temperature phase is fixed approximately at the freezing point of water ($0°$ C.), so that, when the ball bearing is in operation, the situation is ruled out where the bearing balls are deformed in an undesirable way due to external temperature influences or to an associated automatic transition from the austenitic high-temperature phase of the shape memory alloy to its martensitic low-temperature phase, or vice versa. However, the respective transition temperatures of the shape memory alloy can be set individually and can thus be adapted appropriately to the operating conditions of the anti-friction bearing which are to be expected in each case.

The solid-bodied anti-friction bearing designed according to the invention thus has the advantage, as compared with the solid-bodied anti-friction bearings known from the prior art, that, due to the partial use of rolling bodies consisting of a shape memory alloy, it can be designed in the usual way, both on the raceway of the outer bearing ring and on the raceway of the inner bearing ring, with two peripherally continuous rims connected in one piece to these and nevertheless can be filled with rolling bodies completely without interspaces. As a result, the anti-friction bearing designed according to the invention has a very high load-bearing capacity and at the same time can be loaded equally in both axial directions.

BRIEF DESCRIPTION OF THE DRAWINGS

A preferred embodiment of the anti-friction bearing designed according to the invention is explained in more detail below with reference to the accompanying drawings, in which.

DETAILED DESCRIPTION OF THE DRAWINGS

Figure 1:
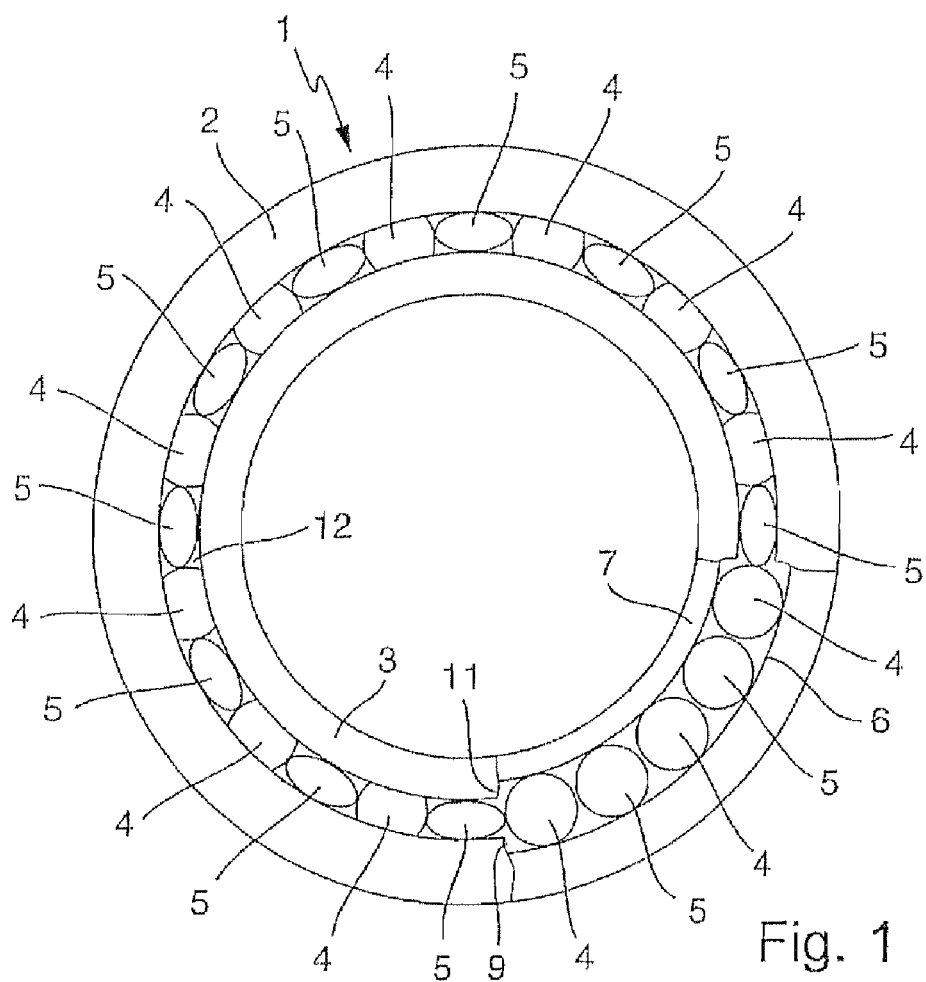
FIG. 1 shows a side view of a cylindrical roller bearing designed according to the invention.
Figure 2:
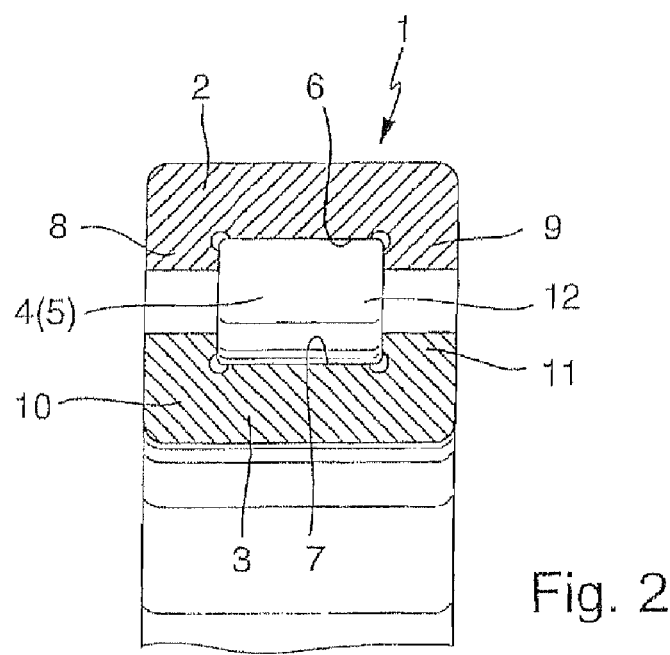
FIG. 2 shows an enlarged illustration of a partial cross section through a cylindrical roller bearing designed according to the invention.

An anti-friction bearing 1 designed as a solid-roller cylindrical roller bearing is clearly apparent from FIGS. 1 and 2, which consist essentially of an outer bearing ring 2 and of an inner bearing ring 3 and also of a number of rolling bodies 4, 5 which are arranged between the bearing rings 2, 3 and which roll on a raceway 6 of the outer bearing ring 2 and on a raceway 7 of the inner bearing ring 3 without any cage guidance with respect to one another.

The anti-friction bearing 1 depicted in FIGS. 1 and 2 is in this case clearly visibly designed according to the invention in such a way that both the raceway 6 of the outer bearing ring 2 and the raceway 7 of the inner bearing ring 3 are each delimited laterally by two peripherally continuous rims 8, 9 and 10, 11 connected in one piece to these and the anti-friction bearing 1 is nevertheless filled completely, without a filling slot or the like, with rolling bodies 4, 5 designed as cylindrical rollers.

The filling of the anti-friction bearing 1 with the rolling bodies 4, 5 in this case takes place through the free space 12 between a rim 9 of the outer bearing ring 2 and a rim 11 of the inner bearing ring 3 with at least a subset of rolling bodies 5 consisting of a shape memory alloy which, as can be seen in FIG. 1, are deformed elliptically in cross section to the dimension of the free space 12 between the rims 9, 11 of the bearing rings 2, 3. The broken-out part view in FIG. 1 in this case makes it clear that, after insertion into the anti-friction bearing 1, these rolling bodies 5 automatically assume, when a predetermined temperature is reached, their original shape corresponding to the shape of the remaining rolling bodies 4, so that a solid-roller cylindrical roller bearing having a high load-bearing capacity both radially and axially is obtained.

As may likewise be gathered from FIG. 1, the number of rolling bodies 5 consisting of a shape memory alloy corresponds in this case to about half the overall number of all the rolling bodies 4, 5 of the anti-friction bearing 1, the rolling bodies 5 which consist of a shape memory alloy being arranged so as to be uniformly distributed circumferentially between the remaining rolling bodies 4 of the anti-friction bearing 1.

FIGS. 1 and 2 also reveal, merely in outlines, that the rolling bodies 5 consisting of a shape memory alloy and of a nickel/titanium alloy are designed with a two-way characteristic which is easily deformable in its martensitic low-temperature phase and assumes its original manufacturing shape during the transition to its austenitic high-temperature phase. Both the martensitic low-temperature phase and the austenitic high-temperature phase of this shape memory alloy are fixed outside the typical operating temperatures of the anti-friction bearing 1 in such a way that the low-temperature phase of the shape memory alloy lies at a temperature of −77° C. corresponding approximately to the nitrogen boiling temperature, while the high-temperature phase of the shape memory alloy is arranged at a temperature of 0° C. corresponding for example to the freezing point of water. Thus, when a cylindrical roller bearing designed in this way is used in the drive of a machine tool, the situation is ruled out where the cylindrical rollers are deformed in an undesirable way due to external temperature influences and to an associated automatic transition from the austenitic high-temperature phase of the shape memory alloy to its martensitic low-temperature phase, or vice versa. At the same time, such a cylindrical roller bearing can be demounted again due to cooling to the nitrogen boiling temperature and the associated elliptic reshaping of the cylindrical rollers.

| List of reference numerals | |
| --- | --- |
| 1 | Anti-friction bearing |
| 2 | Outer bearing ring |
| 3 | Inner bearing ring |
| 4 | Rolling body |
| 5 | Rolling body |
| 6 | Raceway of 2 |
| 7 | Raceway of 3 |
| 8 | Rim of 2 |
| 9 | Rim of 2 |
| 10 | Rim of 3 |
| 11 | Rim of 3 |
| 12 | Free space |

The invention claimed is:

1. An anti-friction bearing, having an outer bearing ring and of an inner bearing ring and rolling bodies which are arranged between the bearing rings and which roll on a raceway of the outer bearing ring and on a raceway of the inner bearing ring without any cage guidance with respect to one another, wherein both the raceway of the outer bearing ring and the raceway of the inner bearing ring are delimited laterally by two peripherally continuous rims connected in one piece to said ring and at least a subset of rolling bodies consisting of a shape memory alloy which are deformed in cross section to the dimension of a free space between the rims of the bearing rings for insertion and, after insertion into the anti-friction bearing automatically assume, when a predetermined temperature is reached, their original shape corresponding to the shape of the remaining rolling bodies.

2. The anti-friction bearing as claimed in claim 1, wherein the number of rolling bodies consisting of a shape memory alloy corresponds to about half the overall number of rolling bodies of the anti-friction bearing, the rolling bodies consisting of a shape memory alloy being arranged so as to be uniformly distributed circumferentially between the remaining rolling bodies of the anti-friction bearing.

3. The anti-friction bearing as claimed in claim 2, wherein the rolling bodies consisting of a shape memory alloy are produced from a nickel/titanium alloy with a one-way or two-way characteristic, which is easily deformable in its martensitic low-temperature phase and assumes its original manufacturing shape during the transition to its austenitic high-temperature phase.

4. The anti-friction bearing as claimed in claim 3, wherein both the martensitic low-temperature phase and the austenitic high-temperature phase of the shape memory alloy are fixed outside the typical operating temperatures of the anti-friction bearing.

* * * * *